(12) United States Patent
Lavertu et al.

(10) Patent No.: US 10,570,835 B2
(45) Date of Patent: Feb. 25, 2020

(54) SUBSTITUTION RATE CONTROL SYSTEM FOR AN ENGINE AND AN ASSOCIATED METHOD THEREOF

(71) Applicant: Transportation IP Holdings, LLC, Norwalk, CT (US)

(72) Inventors: Thomas Michael Lavertu, Clifton Park, NY (US); Adam Edgar Klingbeil, Ballston Lake, NY (US); Omowoleola Chukwuemeka Akinyemi, Clifton Park, NY (US); Victor Manuel Salazar, Clifton Park, NY (US); Roy James Primus, Niskayuna, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 767 days.

(21) Appl. No.: 14/477,110

(22) Filed: Sep. 4, 2014

(65) Prior Publication Data
US 2016/0069287 A1  Mar. 10, 2016

(51) Int. Cl.
*F02D 41/00* (2006.01)
*F02D 35/02* (2006.01)
*F02D 19/08* (2006.01)

(52) U.S. Cl.
CPC ....... *F02D 41/0025* (2013.01); *F02D 35/025* (2013.01); *F02D 41/005* (2013.01);
(Continued)

(58) Field of Classification Search
CPC .. F02D 19/081; F02D 35/025; F02D 41/0025; F02D 41/005; F02D 19/08;
(Continued)

(56) References Cited

U.S. PATENT DOCUMENTS 6,161,519 A * 12/2000 Kimura ................. F02D 35/026
123/299
8,150,601 B2    4/2012 Kawamura et al.
(Continued)

OTHER PUBLICATIONS

170313 Heywood—Internal Combustion Engine Fundamentals chap 3 thermochemistry.pdf.*
(Continued)

*Primary Examiner* — Carl C Staubach
(74) *Attorney, Agent, or Firm* — McCoy Russell LLP

(57) ABSTRACT

A method involves receiving a plurality of engine parameters and a sensed ambient operating condition during operation of an engine and determining a current substitution rate based on the plurality of engine parameter. The method also involves determining at least one of a pre-combustion temperature and an end gas temperature based on the plurality of engine parameters and the sensed ambient operating condition and determining a maximum substitution rate based on at least one of the pre-combustion temperature and the end gas temperature. The method further involves comparing the current substitution rate with the maximum substitution rate and controlling at least one engine parameter among the plurality of engine parameters if the current substitution rate is different from the maximum substitution rate so as to generate the current substitution rate to less than or equal to the maximum substitution rate.

26 Claims, 8 Drawing Sheets

(52) U.S. Cl.
CPC ............. *F02D 19/081* (2013.01); *Y02T 10/36* (2013.01); *Y02T 10/47* (2013.01)

(58) Field of Classification Search
CPC .... F02D 19/10; F02D 35/026; F02D 41/0027; F02D 19/06; F02D 19/0615; F02D 19/0642; F02D 19/0647; F02M 21/00
USPC ............ 123/27 GE, 304, 525–527, 575–578; 701/103, 104; 60/39.465
See application file for complete search history.

(56) References Cited

U.S. PATENT DOCUMENTS

| | | | |
|---|---|---|---|
| 9,371,789 B2* | 6/2016 | Rosswurm | F02D 41/0027 |
| 2002/0007816 A1 | 1/2002 | Zur et al. | |
| 2004/0220720 A1* | 11/2004 | Noda | F02D 35/026 |
| | | | 701/111 |
| 2011/0088654 A1* | 4/2011 | Courtoy | F02D 19/0647 |
| | | | 123/299 |
| 2012/0210988 A1 | 8/2012 | Willi | |
| 2012/0271533 A1* | 10/2012 | Shishime | F02D 35/021 |
| | | | 701/105 |
| 2013/0054116 A1 | 2/2013 | Lepley | |
| 2013/0220274 A1* | 8/2013 | Deshpande | F02D 19/105 |
| | | | 123/350 |
| 2014/0074380 A1 | 3/2014 | Fisher et al. | |
| 2014/0136080 A1* | 5/2014 | Sivasubramanian | F02D 19/0623 |
| | | | 701/103 |
| 2014/0373822 A1* | 12/2014 | Rosswurm | F02D 41/0027 |
| | | | 123/676 |
| 2015/0240738 A1* | 8/2015 | Yerace | F02B 3/08 |
| | | | 123/27 GE |
| 2015/0377159 A1* | 12/2015 | Fisher | F02D 41/0027 |
| | | | 123/525 |
| 2016/0069252 A1* | 3/2016 | Lavertu | F02B 37/10 |
| | | | 123/435 |

OTHER PUBLICATIONS

Mukherjee et al., "An Embedded System Based Control Strategy for Nox Reduction in Diesel-Cng Engines", SASTECH, pp. 57-64, vol. 9, Issue 1, Apr. 2010.

Debnath et al., "Effect of hydrogen-diesel quantity variation on brake thermal efficiency of a dual fuelled diesel engine", Journal of Power Technologies, pp. 55-67, vol. 92, Issue 1, 2012.

Cummins Inc.—News Release "Cummins Announces Three Innovations at MINExpo", Cummins Inc, 2012, 3 Pages.

Yang, B et al., "The Development of an Electronic Control Unit for a High Pressure Common Rail Diesel/Natural Gas Dual-Fuel Engine", SAE Technical Paper, Apr. 1, 2014, 11 Pages.

* cited by examiner

SUBSTITUTION RATE CONTROL SYSTEM FOR AN ENGINE AND AN ASSOCIATED METHOD THEREOF

BACKGROUND

The invention relates generally to engines, and more particularly, to a system and method for controlling a substitution rate in an engine, for example, a dual fuel engine.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics may be less than ideal. In addition, conventional techniques to improve one operational characteristic often worsens one or more other operational characteristics. For example, attempts to decrease specific fuel consumption often cause increase in various exhaust emissions. Engine exhaust emissions including pollutants such as carbon monoxide, nitrogen oxides ($NO_x$), particulate matter (PM), and unburned hydrocarbons (UHC) are generated due to imperfect combustion of fuel within the combustion chamber. The amount of these pollutants varies depending on the fuel-air mixture, compression ratio, injection timing, ambient conditions, and so forth.

In the oil and gas market and transportation sector, for example, expenditure on fuel is one of the main contributors to the total cost of operation. The rapid expansion and abundance of natural gas in some areas of the world is driving a dramatic cost advantage of natural gas over diesel fuel, making natural gas a very economical fuel source. A dual fuel engine is based on a traditional diesel engine, with the addition of dual fuel specific hardware. When the engine is operating in dual fuel mode, natural gas is introduced into its intake system. Near the end of the compression stroke, diesel fuel is then injected. The diesel fuel ignites and the diesel combustion causes the natural gas to burn. In one example, around 40 percent diesel is injected and sixty percent natural gas is injected.

The substitution rate is defined as the fraction of the total fuel energy that is provided by the gaseous fuel, for example, natural gas. The maximum substitution rate for a dual fuel engine is generally limited by knock and fast combustion which are each driven by in-cylinder temperatures at the start of combustion. Specifically, the substitution rate is often limited by the rate of combustion for a given operating condition. In other words, for many cases, the rate of combustion can be rapid if the substitution rate is substantially increased.

There is a need for an enhanced system and method for controlling substitution rate for an engine in order to control the rate of combustion.

BRIEF DESCRIPTION

In accordance with one exemplary embodiment, a method involves receiving a plurality of engine parameters and a sensed ambient operating condition during operation of an engine and determining a current substitution rate based on the plurality of engine parameter. The method also involves determining at least one of a pre-combustion temperature and an end gas temperature based on the plurality of engine parameters and the sensed ambient operating condition and determining a maximum substitution rate based on at least one of the pre-combustion temperature and the end gas temperature. The method further involves comparing the current substitution rate with the maximum substitution rate and controlling at least one engine parameter among the plurality of engine parameters if the current substitution rate is different from the maximum substitution rate so as to generate the current substitution rate to less than or equal to the maximum substitution rate.

In accordance with another exemplary embodiment, a computer readable medium, having instructions stored thereon which, when executed, causes a controller for an engine to perform a method is disclosed. The method involves receiving a plurality of engine parameters and a sensed ambient operating condition during operation of an engine and determining a current substitution rate based on the plurality of engine parameter. The method also involves determining at least one of a pre-combustion temperature and an end gas temperature based on the plurality of engine parameters and the sensed ambient operating condition and determining a maximum substitution rate based on at least one of the pre-combustion temperature and the end gas temperature. The method further involves comparing the current substitution rate with the maximum substitution rate and controlling at least one engine parameter among the plurality of engine parameters if the current substitution rate is different from the maximum substitution rate so as to generate the current substitution rate to less than or equal to the maximum substitution rate.

In accordance with yet another embodiment, a system is disclosed. The system includes an engine having a plurality of sensors, a plurality of engine cylinders, and a plurality of fuel injectors coupled to the plurality of engine cylinders. The system further includes a controller communicatively coupled to the plurality of injectors and the plurality of sensors. The controller is configured to receive a plurality of engine parameters and a sensed ambient operating condition during operation of an engine and determine a current substitution rate based on the plurality of engine parameter. The controller is further configured to determine at least one of a pre-combustion temperature and an end gas temperature based on the plurality of engine parameters and the sensed ambient operating condition and determine a maximum substitution rate based on at least one of the pre-combustion temperature and the end gas temperature. The system is further configured to compare the current substitution rate with the maximum substitution rate and control at least one engine parameter among the plurality of engine parameters if the current substitution rate is different from the maximum substitution rate so as to generate the current substitution rate to less than or equal to the maximum substitution rate.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
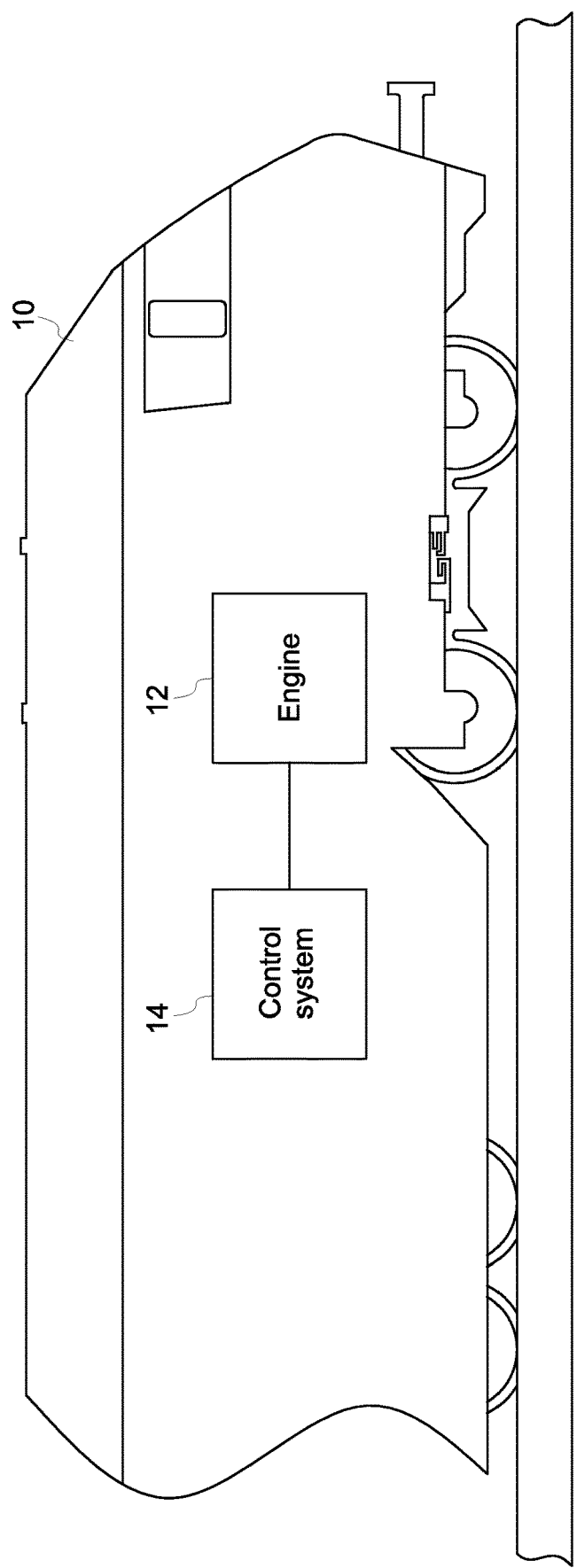
FIG. 1 is a schematic diagrammatical representation of a vehicle moving from a first operating point to a second operating point along a predefined path in accordance with an exemplary embodiment.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the internet, as well as yet to be developed digital means, with the sole exception being a transitory, propagating signal.

As used herein, the terms "software" and "firmware" are interchangeable, and may include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

In accordance with certain embodiments of the present invention, a method for operating an engine is disclosed. The method involves receiving a plurality of engine parameters and a sensed ambient operating condition during operation of an engine. The method also involves determining a current substitution rate based on the plurality of engine parameters. The method further involves determining at least one of a pre-combustion temperature and an end gas temperature based on the plurality of engine parameters and the sensed ambient operating condition. The method also involves determining a maximum substitution rate based on at least one of the pre-combustion temperature and the end gas temperature. The method further involves comparing the current substitution rate with a maximum substitution rate. The method further involves controlling at least one engine parameter among the plurality of engine parameters if the current substitution rate is different from the maximum substitution rate so as to generate the current substitution rate to less than or equal to the maximum substitution rate. In accordance with another embodiment, a computer readable medium, having instructions stored thereon which, when executed, causes a controller for an engine to perform a method, is disclosed. In accordance with yet another embodiment, a system including an engine having a plurality of sensors, a plurality of engine cylinders, and a plurality of fuel injectors coupled to the plurality of engine cylinders, is disclosed. The system further includes a controller communicatively coupled to the plurality of injectors and the plurality of sensors.

Referring to FIG. 1, a schematic diagrammatical representation of a vehicle 10 moving from a first operating point to a second operating point along a predefined path is shown. In the illustrated embodiment, the vehicle 10 is a locomotive. Suitable vehicles include passenger and non-passenger vehicles, hybrid vehicles, off-highway vehicles, on-road vehicles (such as tractor trailers), tracked vehicles, rail vehicles, and the like. The vehicle 10 includes a dual fuel engine 12 and an exemplary control system 14 coupled to the engine 12. While the illustrated FIG. 1 shows one embodiment of the invention, it will be clear to one skilled in the art that this invention may be applied to other engine systems such as those used in power generation and stationary fluid pumping applications. It should also be noted herein that the control system is also applicable to engines utilizing more than two fuels.

In the illustrated embodiment, the vehicle 10 is driven by the dual fuel engine 12 utilizing a plurality of fuels. In the exemplary engine 12, a reduction in nitrogen oxide (NOx) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 12. If the cost of diesel increases relative to the cost of the natural gas, more natural gas may be used resulting in reduced cost and $NO_x$, and particulate matter emissions. If the cost of natural gas is increased relative to the cost of the diesel, then more diesel may be used to drive the engine 12. It should be noted herein that in certain embodiments, the vehicle 10 may also utilize other fuels instead of diesel and natural gas.

The exemplary control system 14 is used to control operation of the engine 12 by using a control strategy that allows the engine 12 to operate at a higher substitution rate while operating within constraints such as knock, peak cylinder pressure, or the like. The substitution rate is defined as a fraction of a total fuel energy that is provided by the gaseous fuel, for example, natural gas. The engine 12 and the control system 14 are explained in greater detail with reference to subsequent figures.

Figure 2:
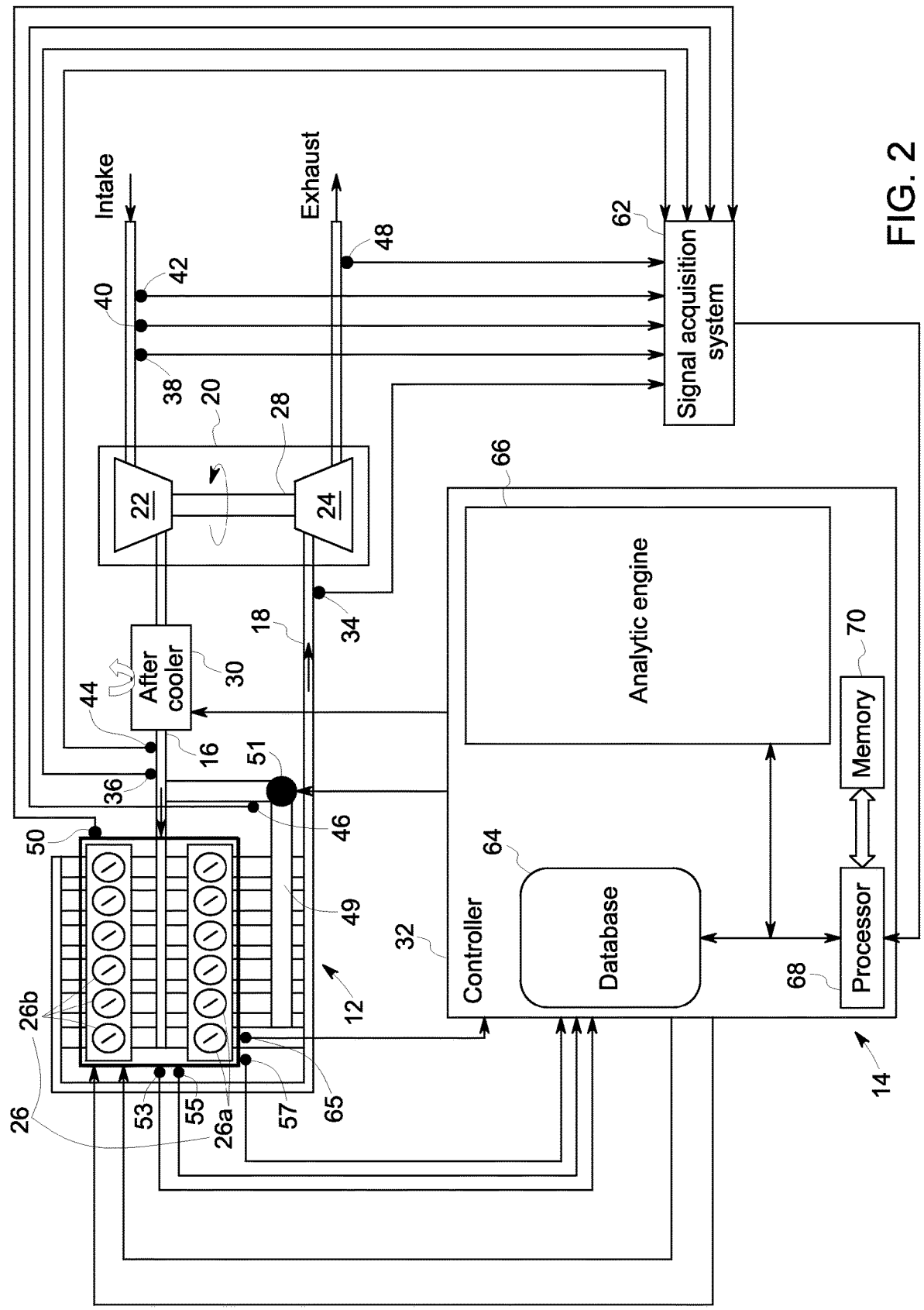
FIG. 2 is a schematic diagrammatical representation of an engine having substitution rate control features in accordance with certain embodiments of the present invention.

Referring to FIG. 2, a schematic diagrammatical representation of the engine 12 having substitution rate control features is illustrated in accordance with certain embodiments of the present invention. As discussed in further detail below, embodiments of the present invention provide monitoring and control features, such as sensors and control logic which allow for control of the substitution rate based on a plurality of engine parameters and a sensed ambient operating condition, thereby enabling maximum substitution rate over a range of operating conditions.

In the illustrated embodiment, the engine 12 is a dual fuel engine. The illustrated engine 12 includes an air intake manifold 16 and an exhaust manifold 18. The engine 12 is provided with a turbocharger 20 having a compressor 22 and a turbine 24. The compressor 22 is operated to supply compressed air to the intake manifold 16 for combustion within a plurality of cylinders 26. The turbine 24 is coupled to the exhaust manifold 18, such that the exhaust gases expand through the turbine 24, putting work onto and rotating a turbocharger shaft 28 coupled to the compressor 22. The compressor 22 draws ambient air through a filter (not shown) and provides compressed air to a heat exchanger 30. The temperature of air is increased due to compression through the compressor 20. The compressed air flows through the heat exchanger 30 such that the temperature of air is reduced prior to delivery into the intake manifold 16 of the engine 12. In one embodiment, the heat exchanger 30 is an air-to-water heat exchanger, which utilizes a coolant to facilitate removal of heat from the compressed air. In another embodiment, the heat exchanger 30 is an air-to-air heat exchanger, which utilizes ambient air to facilitate removal of heat from the compressed air. In another embodiment, the heat exchanger 30 is a combination of an air-to-air heat exchanger and an air-to-liquid heat exchanger, which utilizes both ambient air and liquid to facilitate removal of heat from the compressed air. In yet another embodiment, the engine 12 is naturally aspirated and operates without a turbocharger.

The control system 14 also includes a controller 32. In one embodiment, the controller 32 is an electronic logic controller that is programmable by a user. In the illustrated embodiment, the engine 12 is provided with a plurality of sensors including an exhaust manifold gas pressure sensor 34, an intake manifold air pressure sensor 36, an oxygen concentration sensor 38, an ambient air temperature sensor 40, an ambient air pressure sensor 42, an intake manifold air temperature sensor 44, an exhaust gas recirculation sensor, 46, an exhaust gas emission sensor 48, an engine speed sensor 53, an engine load sensor 55, and a plurality of fuel injection timing sensors 57, 65.

The controller 14 receives the corresponding output signals from the plurality of sensors 34, 36, 38, 40, 42, 44, 46, 48, 53, 55, 57, 65. In some embodiments, only some sensors among the plurality of sensors may be used. In other embodiments, other types of sensors for measuring different parameters associated with the engine 12 may be used.

A piston (not shown) is slidably disposed in each cylinder 26 and reciprocates between a top dead center and a bottom dead center position. In the illustrated embodiment, there are a total of twelve cylinders 26 of which six cylinders 26a are donor cylinders and the remaining six cylinders 26b are non-donor cylinders. It should be noted herein that the donor cylinders 26a provide exhaust gas recirculation to the intake manifold 16. It should be noted herein that in other embodiments, the total number of cylinders 26, number of donor cylinders 26a and the number of non-donor cylinders 26b may vary depending on the application. It should be noted herein that in other embodiments, no such donor cylinders are employed but exhaust gas is recirculated from an exhaust stream to an intake stream via a pump or by pumping using back pressure. In some other embodiments, exhaust gas recirculation may not be employed.

In accordance with the exemplary embodiment of the present invention, the engine 12 is designed in such a way that during operation of the engine 12, the plurality of donor engine cylinders 26a have a first compression ratio and the plurality of non-donor engine cylinders 26b have a second compression ratio greater than the first compression ratio. In one specific embodiment, the donor engine cylinders 26a may have a compression ratio of 13 or 14 whereas the non-donor engine cylinders 26b have a compression ratio of 15.

Donor cylinders have a higher back pressure which results in increased trapped residuals. The increased trapped residuals leads to a higher trapped temperature at closure of intake valve, and thus, a higher compression temperature compared to non-donor cylinders. Therefore, donor cylinders are more prone to knock. In accordance with the embodiments of the present invention, the reduced compression ratio of the donor cylinders 26a facilitates to reduce the compression temperature. Lowering the compression ratio of the donor engine cylinders 26a results in decrease of the in-cylinder temperatures prior to combustion which enables a higher substitution rate and reduction in tendency to knock. Further, the non-donor cylinders 26b can be operated with a higher compression ratio, thereby improving system efficiency. Alternatively, the donor cylinder 26a may have an earlier intake valve closure timing (or reduced volumetric efficiency) to generate a reduced effective compression ratio.

The exhaust gas generated from the donor cylinders 26a is fed via a recirculation pipe 49 to the intake manifold 16. The recirculation pipe 49 is provided with a recirculation valve 51 to control a quantity of exhaust gas recirculation from the donor cylinders 26a to the intake manifold 16. The controller 32 is operable to receive corresponding output signals from the sensors 34, 36, 38, 40, 42, 44, 46, 48, 53, 55, 57, 65 and produce control signals to control first and second fuel injectors 52, 54, the exhaust gas recirculation valve 51, and the heat exchanger 30. The fuel injection timing sensor 57 is used to detect fuel injection timing of the first fuel injector 51 and the fuel injection timing sensor 65 is used to detect fuel injection timing of the second fuel injector 65.

A signal acquisition system 62 receives the plurality of signals from the plurality of sensors 34, 36, 38, 40, 42, 44, 46, 48, 53, 55, 57, 65 and transmits the plurality of signals to the controller 32. The controller 32 includes a database 64, an analytic engine 66, a processor 68, and a memory 70.

The database 64 may be configured to store predefined information about the engine 12. For example, the database 64 may store information relating to exhaust manifold gas pressure, intake manifold pressure, oxygen concentration, ambient air temperature, ambient air pressure, intake manifold air temperature, substitution rate, quantity of exhaust gas recirculation, exhaust gas emissions, engine power, engine speed, engine load, fuel injection timing, valve closure timing, engine compression ratio, or the like. Furthermore, the database 64 may be configured to store actual sensed/detected information from the above-mentioned sensors 34, 36, 38, 40, 42, 44, 46, 48, 53, 55, 57, 65. The algorithm facilitates the processing of signals from the above-mentioned plurality of sensors 34, 36, 38, 40, 42, 44, 46, 48, 53, 55, 57, 65.

In one embodiment, the database 64 may be stored in a single memory module at one location. In other embodiments, the database 64 may be stored in a plurality of memory modules in a distributed manner. The database 64 may be at least one of a SQL database, an Oracle database, and a MySQL database. In alternate embodiments, other types of databases including relationship database systems (RDBS) may be used to store the plurality of rules. It may be noted herein that in one embodiment, the database 64 is a customized database. In other embodiments, the database 64 may be an off-the-shelf database.

The analytic engine 66 is communicatively coupled to the database 64. The analytic engine 66 may be stored in the memory 70 and executable by the processor 68. In an alternate embodiment, the analytic engine 66 may also be a specialized hardware such as a Field Programmable Gate Array (FPGA). The analytic engine 66 includes codes and routines configured to control at least one engine parameter if a current substitution rate is different from a maximum substitution rate so as to generate the current substitution rate equal to the maximum substitution rate. In one embodiment, the analytic engine 66 is configured to control the heat exchanger 30 to reduce an intake manifold air temperature to a predefined temperature limit and the exhaust gas recirculation valve 60 to increase a quantity of exhaust gas recirculation to a predefined quantity limit.

In one embodiment, the analytic engine 66 includes a set of instructions executable by the processor 68. In another embodiment, the analytic engine 66 is stored in the memory 70 and is accessible and executable by the processor 68. In either embodiment, the analytic engine 66 is adapted for communication and co-operation with the processor 68 and other modules of the controller 32.

The processor 68 is communicatively coupled to the database 64 and the analytic engine 66. The processor 68 may include at least one arithmetic logic unit, microprocessor, general purpose controller or other processor arrays to perform the desired computations. In one embodiment, the processor 68 is a custom hardware configured to perform functions of the analytic engine 66 and the signal acquisition system 62. In another embodiment, the processor 68 is a digital signal processor or a microcontroller. The processor 68 may also be configured to manage the contents of the database 64. In some embodiments, other type of processors, operating systems, and physical configurations are envisioned.

The memory 70 is coupled to the processor 68 and may also be optionally coupled to the other modules of the controller 32. The memory 70 is configured to store instructions performed by the processor 68 and contents of the database 64. The memory 70 may be a non-transitory storage medium. For example, the memory 70 may be a dynamic random access memory (DRAM) device, a static random access memory (SRAM) device, flash memory, or other memory devices. In one embodiment, the memory 70 may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory 70 may be communicatively coupled to the processor 68. In an alternate embodiment, the memory 70 is an on-board memory of the processor 68.

In an exemplary embodiment, the non-transitory computer readable medium encoded with a program, instructs the processor 68 to perform functions associated with the controller 32 for controlling operation of the engine 12. The program instructions include one or more functions of the database 64, the analytic engine 66, and the signal acquisition system 62.

Figure 3:
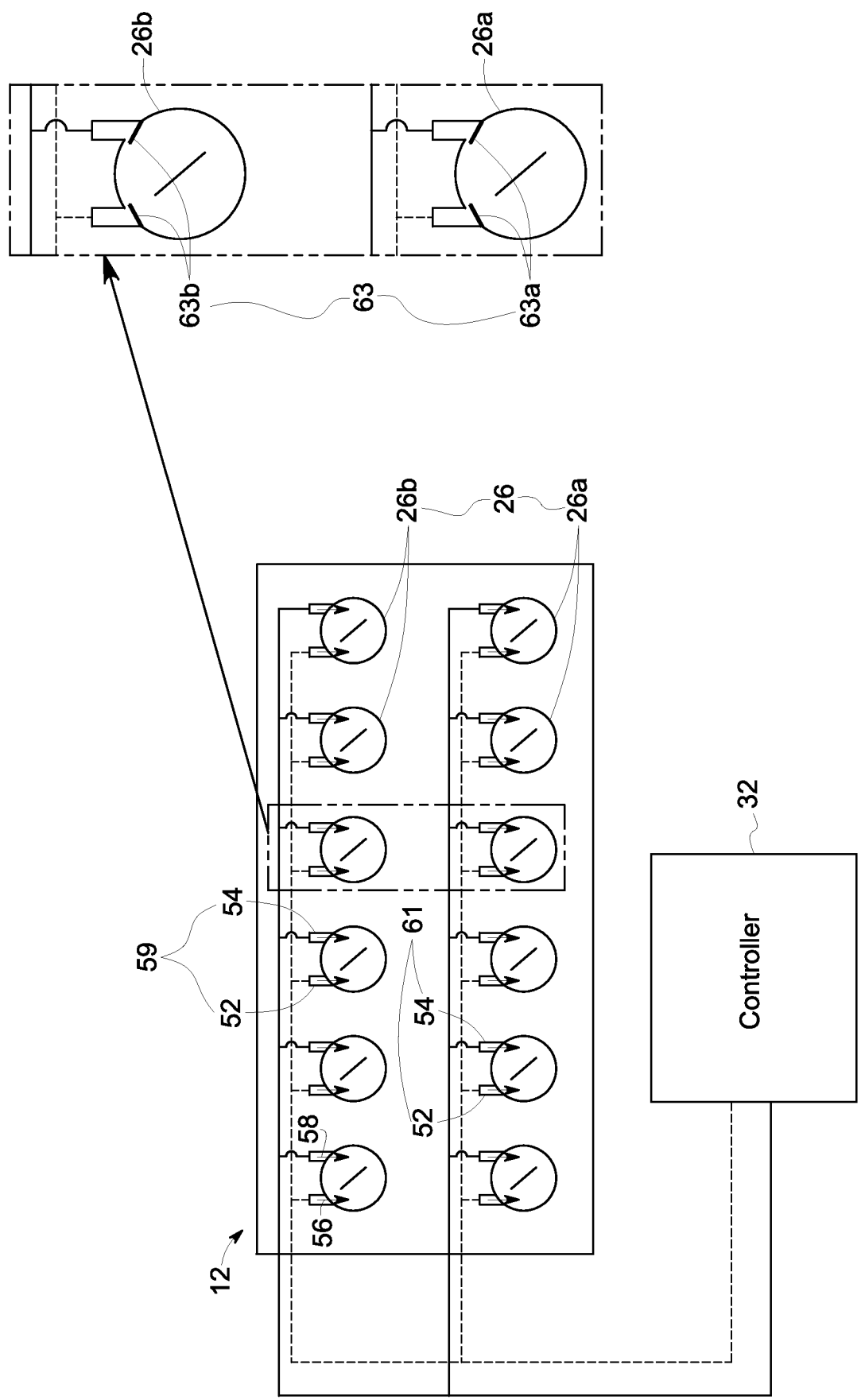
FIG. 3 is a schematic diagrammatical representation of the plurality of cylinders and the controller is illustrated in accordance with the embodiment of FIG. 2.

Referring to FIG. 3, a schematic diagrammatical representation of the plurality of cylinders 26 and the controller 32 is illustrated in accordance with the embodiment of FIG. 2. First and second fuel injectors 52, 54 are used for injecting a plurality of fuels (for example, a first fuel 56 and a second fuel 58 respectively) into the plurality of cylinders 26 of the engine 12. In one embodiment, the first fuel 56 may be diesel and the second fuel 58 may be natural gas. In one embodiment, the first fuel injector 52 is used to inject the first fuel 56 into the plurality of cylinders 26 of the engine 12. The second fuel injector 54 injects the second fuel 58 into the intake manifold 16 of the engine 12. It will be clear to one skilled in the art that the point of injection of either the first or second fuels may be anywhere in the intake manifold 16, intake runner/port or combustion chamber, depending on the specific engine design. Additionally, intake control valves 63 may be provided to control injection of the plurality of fuels into the plurality of cylinders 26. In some embodiments, the controller 32 controls a plurality of first intake control valves 63a of the plurality of donor cylinder 26a to generate a first intake valve closure timing and a plurality of second intake control valves 63b of the plurality of non-donor cylinders 26b to generate a second intake valve closure timing which is different from the first intake valve closure timing so as to generate a different effective compression ratio. In another embodiment, the second intake valve closure timing is later than the first intake valve closure timing. In certain other embodiments, the intake valve and exhaust valve profiles may vary between the cylinders depending on the design.

In one embodiment, a first set of fuel injectors 59 (including the first and second fuel injectors) of the plurality of donor engine cylinders 26a is operated at a first injection timing and a second set of fuel injectors 61 of the plurality of non-donor engine 26b cylinders is operated at a second injection timing different from the first injection timing In one specific embodiment, the first injection timing may be different from the second injection timing by an angle of upto fifteen degrees, for example, of a crank shaft. The crank angle for the injection timing may vary depending on the application. In another embodiment, the second injection timing is later than the first injection timing.

Figure 4:
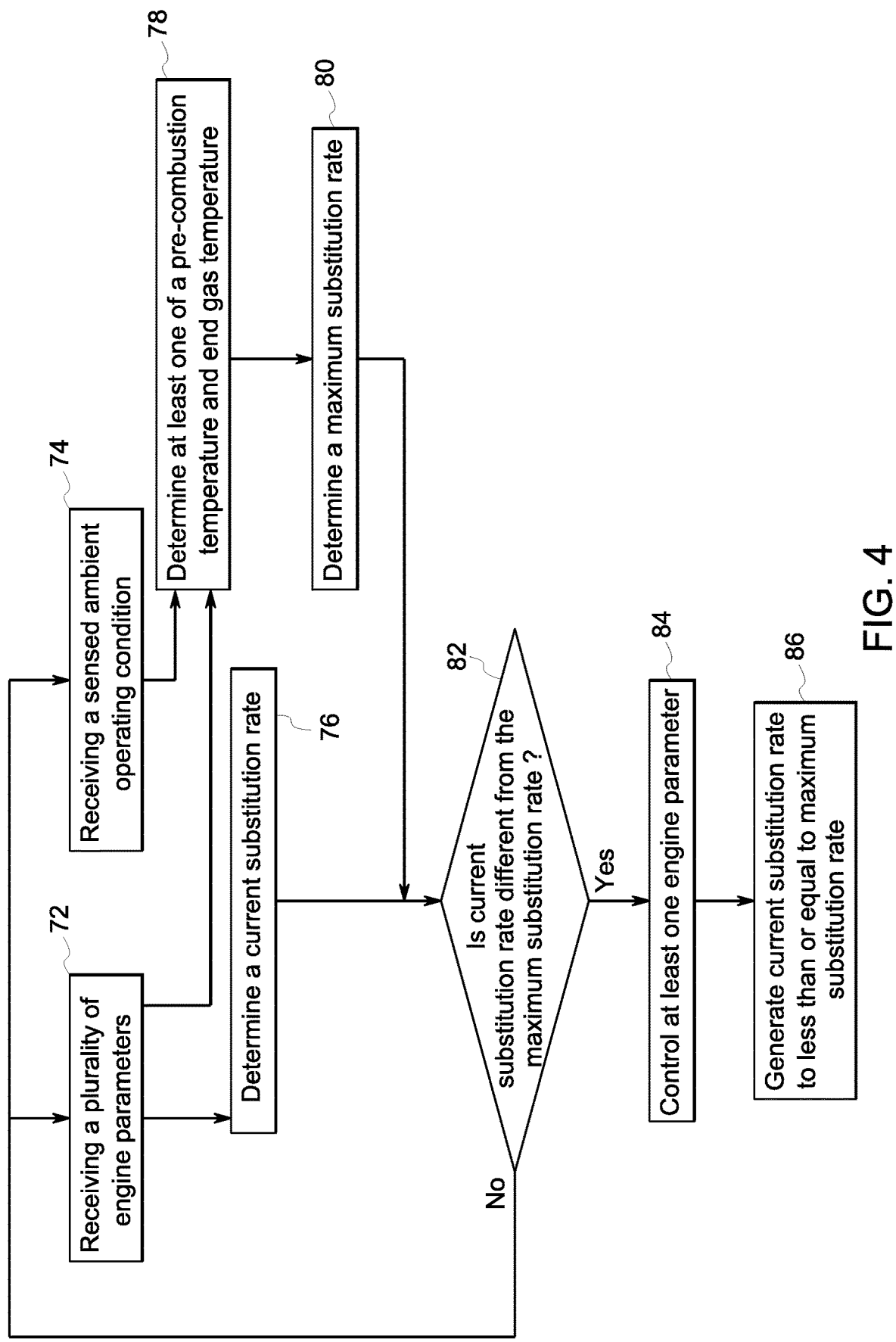
FIG. 4 is a flow chart illustrating the exemplary steps involved in a method for operating an engine in accordance with an exemplary embodiment.

Referring to FIG. 4, a flow chart illustrating the exemplary steps involved in a method for operating a dual fuel engine is disclosed. The method involves receiving a plurality of engine parameters 72 and a sensed ambient operating condition 74 during operation of the dual fuel engine. Specifically, a controller receives the plurality of engine parameters and the sensed ambient operating condition during operation of the dual fuel engine. In one embodiment, the plurality of engine parameters includes an intake manifold air temperature, a concentration of oxygen in intake flow, an intake manifold air pressure, an exhaust manifold gas pressure, a quantity of exhaust gas recirculation, a quantity of exhaust gas emission, engine speed, engine load, fuel injection timing, and an engine compression ratio. The sensed ambient operating condition includes at least one of a sensed ambient temperature and a sensed ambient pressure.

Further, a current substitution rate is determined based on the plurality of engine parameters, using an associated look up table 76. In one embodiment, the current substitution rate is determined based on the fuel injection timings of the plurality of fuels. More specifically, the current substitution rate is determined on the quantity of fuels injected estimated based on the fuel injection timings. In other embodiments, the current substitution rate is determined based on other engine parameters.

The method further involves determining at least one of a pre-combustion temperature and an end gas temperature based on the plurality of engine parameters and the sensed ambient operating condition 78. The pre-combustion temperature is a compression temperature in the engine cylinders before the start of combustion, for example at crank angle of ten degrees before the top dead center or at the top dead center. The end gas temperature is the maximum unburned gas temperature during a cycle. In one specific embodiment, the determination step involves estimating a quantity of trapped residuals in the engine cylinders based on a determined boost and back pressure of the engine, using either a lookup table or transfer functions obtained from simulations. Further, an in-cylinder temperature at the time of inlet valve closure (ivc) is estimated based on the determined boost and backpressure and the intake manifold air temperature, using an associated lookup table or transfer function. Further, a ratio of specific heats (gamma) at the time of ivc is estimated based on the concentration of oxygen in intake flow, injected fuel, and the estimated quantity of trapped residuals, using an associated lookup table. Then, the pre-combustion temperature is estimated based on a compression ratio from the time of ivc up to a predefined crank angle and represented by the relation:

Pre-combustion temperature=temperature at ivc× (compression ratio$^{(gamma-1)}$)

In another embodiment, the pre-combustion temperature may be determined based on a look-up table obtained from simulation data. The end gas temperature may be determined based on an assumed peak cylinder pressure. A maximum substitution rate is determined based on at least one of the pre-combustion temperature and the end gas temperature 80, using an associated lookup table obtained from simulation data. Thereafter, the current substitution rate is compared with a maximum substitution rate 82. The method further involves controlling at least one engine parameter if the current substitution rate is different from the maximum substitution rate 84 so as to generate the current substitution rate to less than or equal to the maximum substitution rate 86. In one specific embodiment, if the current substitution rate is greater than the maximum substitution rate, the controller controls the heat exchanger 30 (shown in FIG. 2) for reducing the intake manifold air temperature to a predefined temperature limit, and/or the exhaust gas recirculation valve 51 (shown in FIG. 2) for increasing a quantity of exhaust gas recirculation to a predefined quantity limit, thereby reducing a concentration of oxygen in intake flow and the ratio of specific heats (gamma) Further, the pre-combustion temperature or the end-gas temperature is reduced for allowing higher substitution rate.

In one embodiment, the controller determines a first current substitution rate for the plurality of donor engine cylinders and a second current substitution rate for the plurality of non-donor engine cylinders. Further, the controller determines a first maximum substitution rate for the plurality of donor engine cylinders and a second maximum substitution rate for the plurality of non-donor engine cylinders. In one specific embodiment, the first current substitution rate and the first maximum substitution rate are determined based on at least one of the first compression ratio and the first injection timing of the donor engine cylinders. The second current substitution rate and the second maximum substitution rate are determined based on at least one of the second compression ratio and the second injection timing of the donor engine cylinders.

In accordance with the embodiments of the present invention, a control strategy involves determining a current substitution rate based on the plurality of engine parameters and a maximum substitution rate based on at least one of the pre-combustion temperature and end gas temperature. The pre-combustion temperature and/or end gas temperature is based on the engine parameters and sensed ambient operating condition. For example, the pre-combustion temperature or end gas temperature is dependent on the intake manifold air temperature and the ratio of specific heats. The ratio of specific heats is in turn dependent on the rate of exhaust gas recirculation among other engine parameters. It should be noted herein that the intake manifold air temperature and ratio of specific heats are determined with reference to a mixture of air and fuel or a mixture of air, fuel and recirculated exhaust gas. At least one engine parameter is controlled, thereby enabling generation of a maximum substitution rate over a range of operating conditions. The exemplary control strategy enables the engine to operate at a higher substitution rate over a range of operating conditions, thereby improving the fuel flexibility of the engine.

Further, increasing the exhaust gas recirculation at a constant intake manifold temperature, allows increase in substitution rate by reducing the pre-combustion or end gas temperature. Additionally, exhaust gas recirculation reduces the ratio of specific heats (i.e., gamma) of the intake flow to the engine, resulting in a lower in-cylinder temperature and an increase in the substitution rate.

Figure 5:
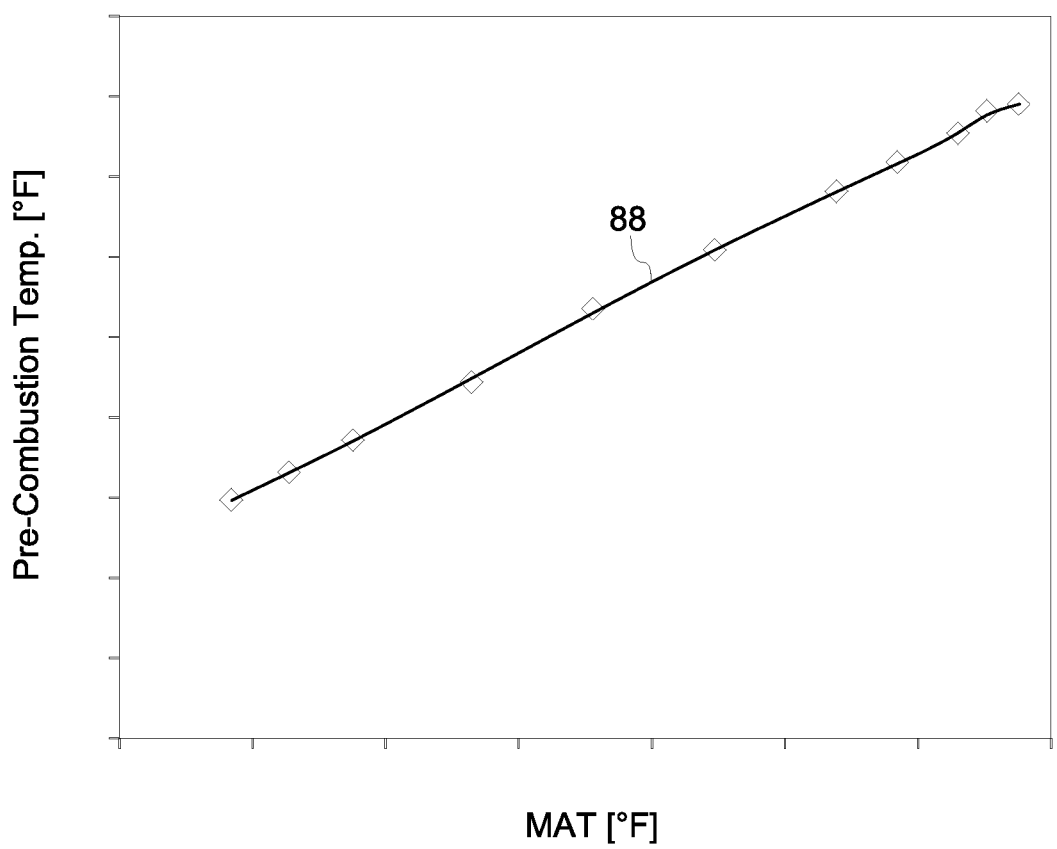
FIG. 5 is a graph illustrating variation of pre-combustion temperature with reference to intake manifold air temperature in accordance with an exemplary embodiment.

Referring to FIG. 5, a graph illustrating variation of a pre-combustion temperature with reference to an intake manifold air temperature is shown. X-axis is representative of the intake manifold air temperature in degrees Fahrenheit and Y-axis is representative of the pre-combustion temperature in degrees Fahrenheit. A curve 88 is indicative of increase in the pre-combustion temperature when the intake manifold temperature is increased, thereby impacting the substitution rate. In the illustrated embodiment, a compression ratio is equal to fifteen and percentage of exhaust gas recirculation is equal to thirty.

Figure 6:
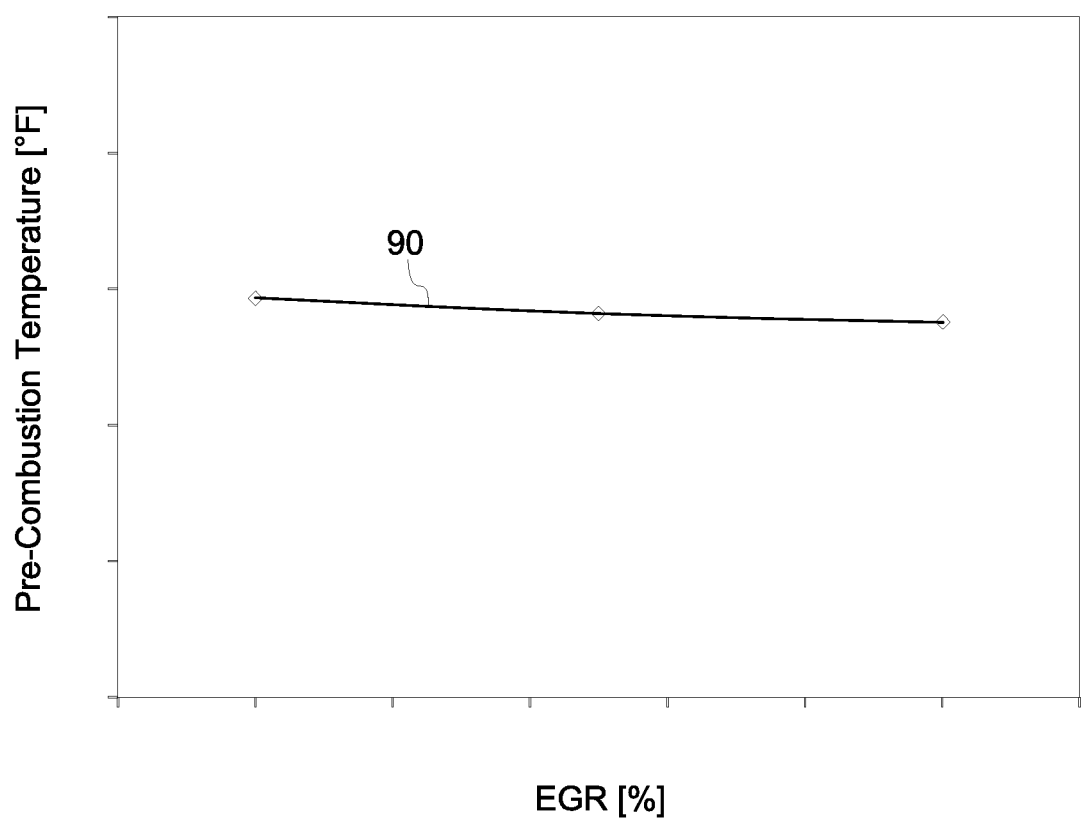
FIG. 6 is a graph illustrating variation of pre-combustion temperature with reference to quantity of exhaust gas recirculation in accordance with an exemplary embodiment.

Referring to FIG. 6, a graph illustrating variation of a pre-combustion temperature with reference to a quantity of exhaust gas recirculation is shown. X-axis is representative of a percentage of the exhaust gas recirculation and Y-axis is representative of the pre-combustion temperature in degrees Fahrenheit. A curve 90 is indicative of an approximately constant pre-combustion temperature with increase in percentage of the exhaust gas recirculation. In the illustrated embodiment, engine full power is equal to eight and compression ratio is equal to 15. In the illustrated embodiment, the intake manifold temperature varies with reference to exhaust gas recirculation. Specifically, the intake manifold temperature increases when there is an increase in the exhaust gas recirculation.

Figure 7:
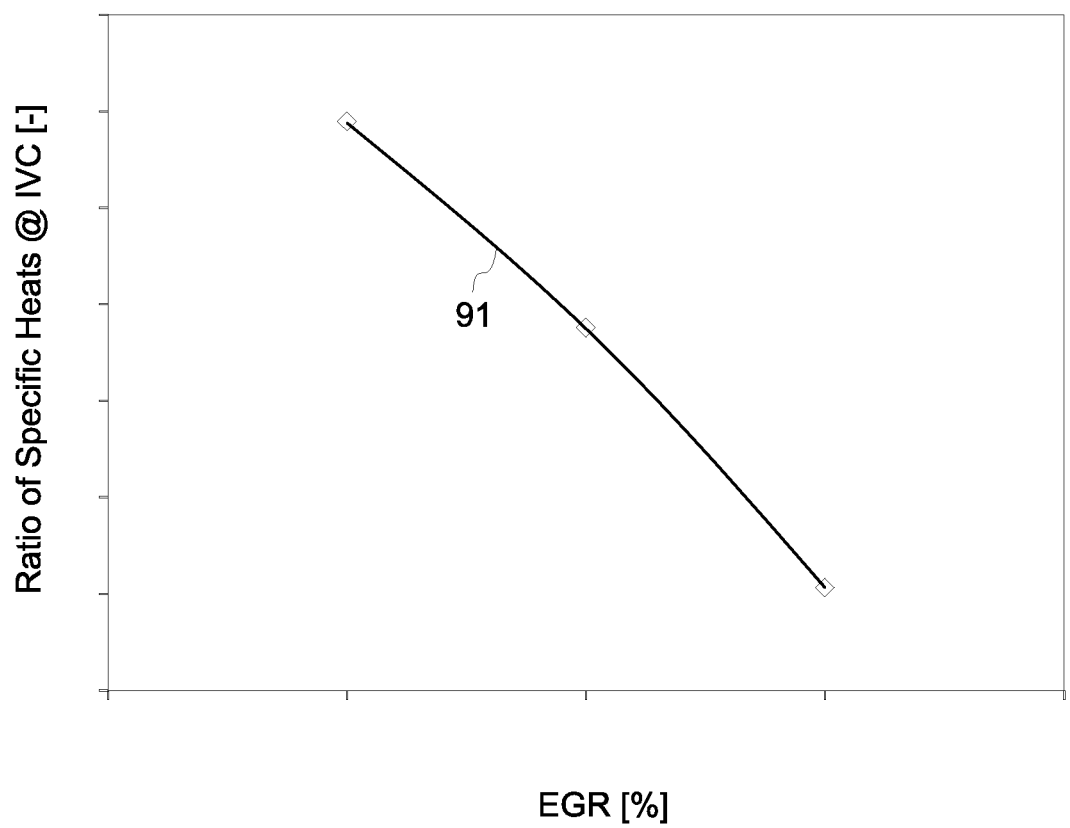
FIG. 7 is a graph illustrating variation of ratio of specific heats (gamma) with reference to quantity of exhaust gas recirculation in accordance with an exemplary embodiment.

Referring to FIG. 7, a graph illustrating variation of a ratio of specific heats (gamma) with reference to a quantity of exhaust gas recirculation is shown. X-axis is representative of a percentage of exhaust gas recirculation and Y-axis is representative of a ratio of specific heats (gamma). A curve 91 is indicative of increase in gamma when the percentage of exhaust gas recirculation is reduced, which impacts the compression temperature. Higher gamma results in higher compression temperature.

Figure 8:
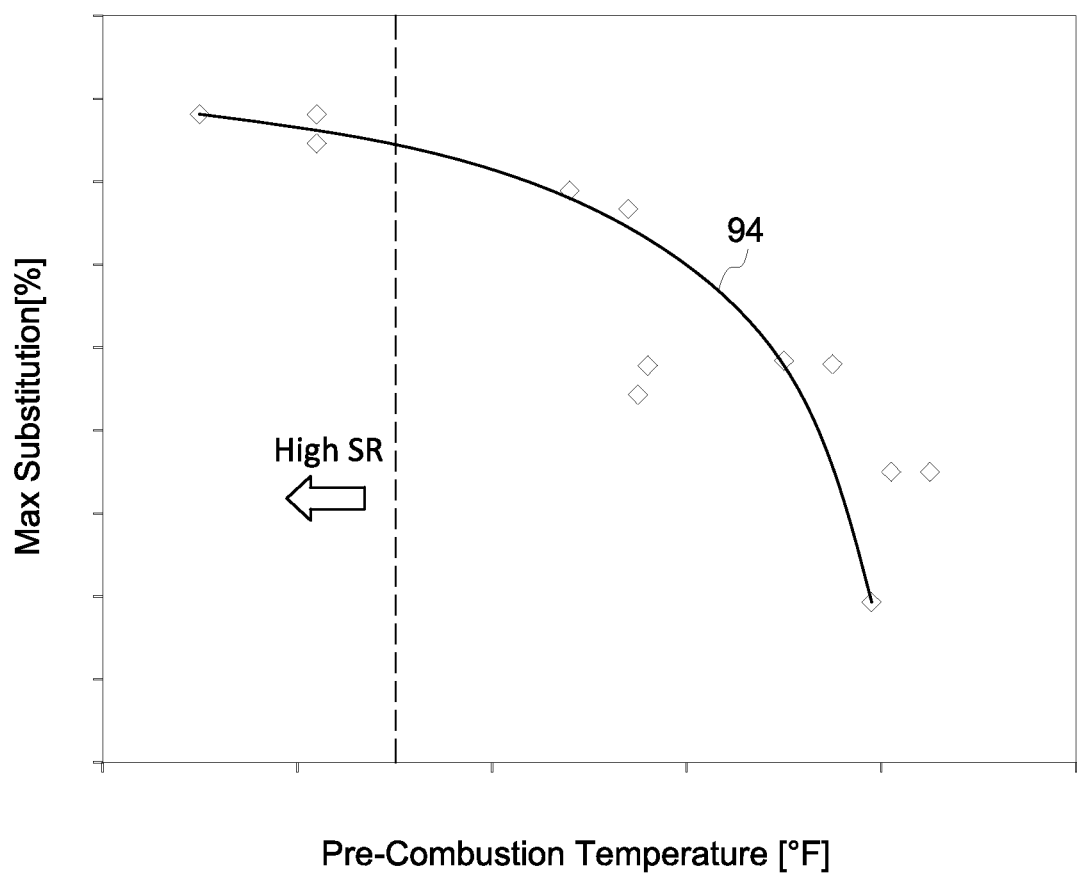
FIG. 8 is a graph illustrating variation of maximum substitution rate with reference to pre-combustion temperature in accordance with an exemplary embodiment.

Referring to FIG. 8, a graph illustrating variation of a maximum substitution rate with reference to a pre-combustion temperature is shown. X-axis is representative of the pre-combustion temperature in degrees Fahrenheit and Y-axis is representative of a maximum substitution rate in percentage. A curve 94 is indicative of an increase in the maximum substitution rate when the pre-combustion temperature is reduced.

In accordance with the embodiments discussed herein, a substitution rate is increased by controlling a pre-combustion or end gas temperature, using exhaust gas recirculation. Further, in some embodiments, the dual fuel engine is designed for a lower compression ratio in the donor engine cylinders and a higher compression ratio in the non-donor engine cylinders, thereby allowing the donor engine cylinders to operate at a higher substitution rate while reducing knock. In other embodiments, the dual fuel engine is designed to generate a higher compression ratio in the donor engine cylinders and a lower compression ratio in the non-donor engine cylinders. In certain other embodiments, a plurality of intake control valves of the plurality of donor cylinder is controlled to generate a first intake valve closure timing and a plurality of second intake control valves of the plurality of non-donor cylinders is controlled to generate a second intake valve closure timing which is different from the first intake valve closure timing.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
    receiving a plurality of engine parameters during operation of an engine, the plurality of engine parameters including at least a concentration of oxygen in an intake flow and a first exhaust back pressure for a first group of cylinders of the engine and a second exhaust back pressure for a second group of cylinders of the engine, the first exhaust back pressure different than the second exhaust back pressure;
    determining a current substitution rate based on one or more of the plurality of engine parameters;
    determining at least one of a pre-combustion temperature in each cylinder of the engine and an end gas temperature based on respective one or more of the plurality of engine parameters, where the one or more of the plurality of engine parameters used to determine the pre-combustion temperature in each cylinder includes at least the concentration of oxygen in the intake flow, the pre-combustion temperature for each cylinder of the first group of cylinders further based on the first exhaust back pressure and the pre-combustion temperature for each cylinder of the second group of cylinders further based on the second exhaust back pressure;
    determining a maximum substitution rate for each cylinder based on at least one of the respective pre-combustion temperature and the end gas temperature;
    comparing the current substitution rate with each maximum substitution rate; and
    controlling at least one engine parameter among the plurality of engine parameters if the current substitution rate is different from one or more maximum substitution rates so as to generate the current substitution rate to less than or equal to the maximum substitution rate.

2. The method of claim 1, wherein the one or more of the plurality of engine parameters used to determine the end gas temperature includes cylinder pressure, and wherein the one or more of the plurality of engine parameters used to determine the pre-combustion temperature further comprises an intake manifold air temperature, a fuel injection amount, and an engine compression ratio.

3. The method of claim 2, wherein the comparing further comprises determining if the current substitution rate is less than each maximum substitution rate, and wherein determining the pre-combustion temperature in each cylinder includes determining, for each cylinder, an amount of trapped residuals in that cylinder based on boost pressure and the first or second exhaust back pressure, determining a cylinder temperature at intake valve closing for that cylinder based on the boost pressure, first or second exhaust back pressure, and the intake manifold air temperature, determining a specific heat for that cylinder based on the fuel injection amount, the amount of trapped residuals, and the concentration of oxygen in the intake flow, and determining the pre-combustion temperature of that cylinder based on the cylinder temperature at intake valve closing of that cylinder, the specific heat of that cylinder, and the compression ratio of that cylinder.

4. The method of claim 3, wherein the controlling further comprises performing at least one of reducing the intake manifold air temperature to a predefined temperature limit and increasing a quantity of exhaust gas recirculation to a predefined quantity limit if the current substitution rate is greater than the maximum substitution rate.

5. The method of claim 1, wherein operation of the engine comprises operating a plurality of donor engine cylinders at a first compression ratio and a plurality of non-donor engine cylinders at a second compression ratio greater than the first compression ratio.

6. The method of claim 1, wherein operation of the engine comprises operating a plurality of first intake control valves of a plurality of donor engine cylinders at a first valve closure timing and a plurality of second intake control valves of a plurality of non-donor engine cylinders at a second valve closure timing different from the first valve closure timing.

7. The method of claim 1, wherein operation of the engine comprises operating a first set of fuel injectors of a plurality of donor engine cylinders at a first injection timing and a second set of fuel injectors of a plurality of non-donor engine cylinders at a second injection timing different from the first injection timing.

8. The method of claim 1, wherein the current substitution rate comprises a first current substitution rate for a plurality of donor engine cylinders and a second current substitution rate for a plurality of non-donor engine cylinders and the maximum substitution rate comprises a first maximum substitution rate for the plurality of donor engine cylinders and a second maximum substitution rate for the plurality of non-donor engine cylinders.

9. The method of claim 1, further comprising recirculating an exhaust gas from a plurality of donor engine cylinders to an intake manifold of the engine.

10. A non-transitory computer readable medium, having instructions stored thereon which, when executed, cause a controller for an engine to perform a method, the method comprising:
    receiving a plurality of engine parameters including at least a concentration of oxygen in an intake flow during operation of the engine;
    determining a current substitution rate based on one or more of the plurality of engine parameters;
    determining at least one of a pre-combustion temperature in cylinders of the engine and an end gas temperature based on respective one or more of the plurality of engine parameters, where the one or more of the plurality of engine parameters used to determine the pre-combustion temperature comprises at least the concentration of oxygen in the intake flow;

determining a maximum substitution rate based on at least one of the pre-combustion temperature and the end gas temperature;

comparing the current substitution rate with the maximum substitution rate; and controlling at least one engine parameter among the plurality of engine parameters if the current substitution rate is different from the maximum substitution rate so as to generate the current substitution rate to less than or equal to the maximum substitution rate.

11. The non-transitory computer readable medium of claim 10, wherein the one or more of the plurality of engine parameters used to determine the end gas temperature includes cylinder pressure, and wherein the one or more of the plurality of engine parameters used to determine the pre-combustion temperature further comprises an intake manifold air temperature, an intake manifold air pressure, an exhaust manifold gas pressure, a fuel injection amount, and an engine compression ratio.

12. The non-transitory computer readable medium of claim 11, wherein the comparing further comprises determining if the current substitution rate is less than the maximum substitution rate.

13. The non-transitory computer readable medium of claim 10, wherein the controlling further comprises performing at least one of reducing the intake manifold air temperature to a predefined temperature limit and increasing a quantity of exhaust gas recirculation to a predefined quantity limit if the current substitution rate is greater than the maximum substitution rate.

14. The non-transitory computer readable medium of claim 10, wherein operation of the engine comprises operating a plurality of donor engine cylinders at a first compression ratio and a plurality of non-donor engine cylinders at a second compression ratio greater than the first compression ratio.

15. The non-transitory computer readable medium of claim 10, wherein operation of the engine comprises operating a plurality of first intake control valves of a plurality of donor engine cylinders at a first valve closure timing and a plurality of second intake control valves of a plurality of non-donor engine cylinders at a second valve closure timing different from the first valve closure timing.

16. The non-transitory computer readable medium of claim 10, wherein operation of the engine comprises operating a first set of fuel injectors of a plurality of donor engine cylinders at a first injection timing and a second set of fuel injectors of a plurality of non-donor engine cylinders at a second injection timing different from the first injection timing.

17. The non-transitory computer readable medium of claim 10, wherein the current substitution rate comprises a first current substitution rate for a plurality of donor engine cylinders and a second current substitution rate for a plurality of non-donor engine cylinders and the maximum substitution rate comprises a first maximum substitution rate for the plurality of donor engine cylinders and a second maximum substitution rate for the plurality of non-donor engine cylinders.

18. The non-transitory computer readable medium of claim 10, wherein the method further comprises recirculating an exhaust gas from a plurality of donor engine cylinders to an intake manifold of the engine.

19. A system comprising:

an engine comprising a plurality of sensors including at least an oxygen concentration sensor, a plurality of engine cylinders, and a plurality of fuel injectors coupled to the plurality of engine cylinders; and a controller communicatively coupled to the plurality of fuel injectors and the plurality of sensors, wherein the controller is configured to:

receive a plurality of engine parameters during operation of the engine, where the plurality of engine parameters is received from the plurality of sensors;

determine a current substitution rate based on one or more of the plurality of engine parameters;

determine at least one of a pre-combustion temperature in the plurality of engine cylinders and an end gas temperature based on respective one or more of the plurality of engine parameters, including determining the pre-combustion temperature at least based on output received from the oxygen concentration sensor;

determine a maximum substitution rate based on at least one of the pre-combustion temperature and the end gas temperature;

compare the current substitution rate with the maximum substitution rate; and control at least one engine parameter among the plurality of engine parameters if the current substitution rate is different from the maximum substitution rate so as to generate the current substitution rate to less than or equal to the maximum substitution rate.

20. The system of claim 19, wherein the controller is configured to determine the pre-combustion temperature further based on output from the plurality of sensors, including an intake manifold air temperature sensor, an intake manifold air pressure sensor, and an exhaust manifold gas pressure sensor.

21. The method of claim 1, wherein the pre-combustion temperature=(a temperature at an inlet valve closing)×(compression ratio$^{(gamma-1)}$), wherein the compression ratio is determined from a time of inlet valve closing up to a predefined crank angle and gamma is a ratio of specific heats of a first fuel and a second fuel.

22. The method of claim 1, wherein determining at least one of the pre-combustion temperature and the end gas temperature based on the respective one or more of the plurality of engine parameters comprises determining both the pre-combustion temperature and the end gas temperature.

23. The non-transitory computer readable medium of claim 10, wherein the pre-combustion temperature= (a temperature at an inlet valve closing)×(compression ratio$^{(gamma-1)}$), wherein the compression ratio is determined from a time of inlet valve closing up to a predefined crank angle and gamma is a ratio of specific heats of a first fuel and a second fuel.

24. The non-transitory computer readable medium of claim 10, wherein determining at least one of the pre-combustion temperature and the end gas temperature based on the respective one or more of the plurality of engine parameters comprises determining both the pre-combustion temperature and the end gas temperature.

25. The system of claim 19, wherein the pre-combustion temperature=(a temperature at an inlet valve closing)×(compression ratio$^{(gamma-1)}$), wherein the compression ratio is determined from a time of inlet valve closing up to a predefined crank angle and gamma is a ratio of specific heats of a first fuel and a second fuel.

26. The system of claim 19, wherein determining at least one of the pre-combustion temperature and the end gas temperature based on the respective one or more of the plurality of engine parameters comprises determining both the pre-combustion temperature and the end gas temperature.

\* \* \* \* \*